April 28, 1936.  N. M. LOWER  2,039,095
AUTOMOBILE BRAKE
Filed March 28, 1928    2 Sheets-Sheet 1
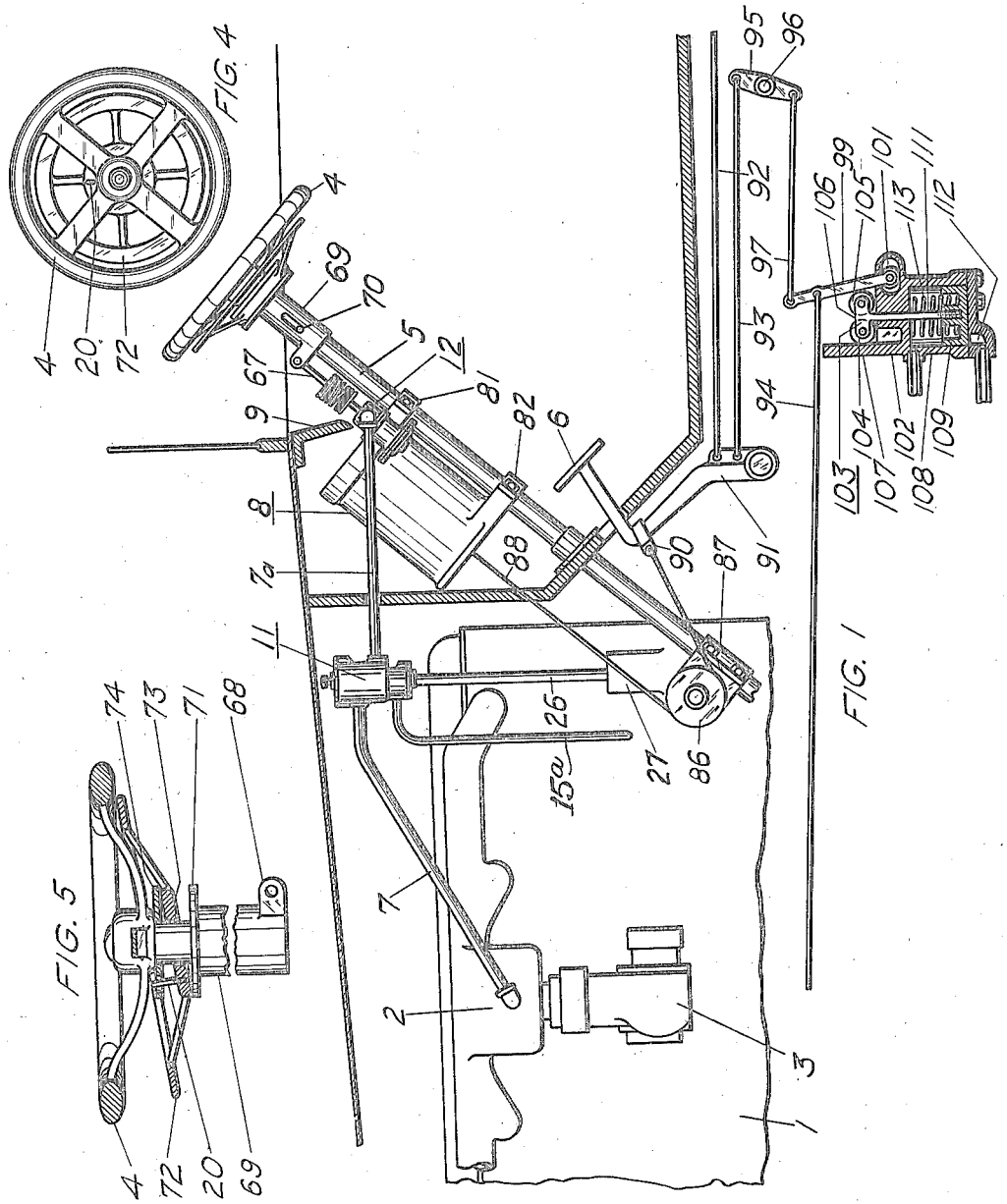
INVENTOR:
Nathan M. Lower
By Brown & Critchlow
his Attorneys April 28, 1936.  N. M. LOWER  2,039,095
AUTOMOBILE BRAKE
Filed March 28, 1928   2 Sheets-Sheet 2
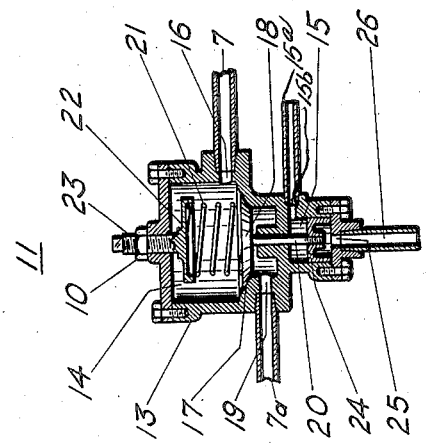
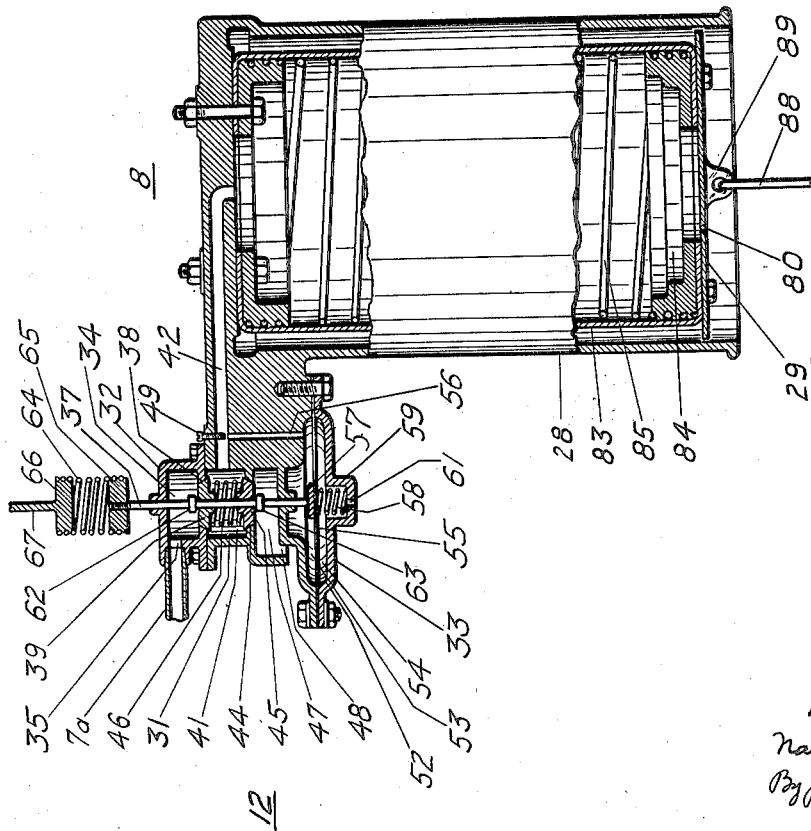
INVENTOR:
Nathan M. Lower,
By Brown & Critchlow
his Attorneys.

Patented Apr. 28, 1936

2,039,095

UNITED STATES PATENT OFFICE 2,039,095

AUTOMOBILE BRAKE

Nathan M. Lower, Bellevue, Pa.

Application March 28, 1928, Serial No. 265,479

13 Claims. (Cl. 188—152)

This invention relates to brake systems and particularly to a vacuum actuated brake system for use on motor driven vehicles.

The object of the invention generally stated is to provide a vacuum brake system which is comparatively simple, compact, semi-automatic, and highly efficient in operation.

A more specific object of the invention is to provide a vacuum brake system of the above described character which may be actuated by the vacuum maintained in the intake manifold of the internal combustion engine used for propelling the vehicle, which may be manually controlled by suitable and convenient means and which will function automatically to gradually reduce the applied braking effort, as the vehicle decelerates.

It is also an object of the invention to provide a braking system for automobiles which may be operated from the steering wheel of the machine by a driver without removing his hands from the wheel.

Another object of the invention is to provide a brake system of the character described wherein provision is made for automatically varying the braking effort applied to the front wheel brakes in a different proportion to that applied to the rear wheels of the vehicle.

A further object of the invention is to provide a brake system such as described which may be either attached to automobiles already in use or provided as part of their initial equipment.

Another object of the invention is to provide a vacuum brake actuating device which may be readily attached to the steering post of a motor driven vehicle and actuated from the steering wheel.

Other objects of the invention will become apparent when the following description is read in conjunction with the accompanying drawings wherein Fig. 1 illustrates a fragmentary elevational view of a motor vehicle equipped with a preferred embodiment of the invention; Fig. 2 a sectional view taken vertically through the center of the manually operated pneumatic pressure control valve and the pneumatic pressure operable brake actuating mechanism; Fig. 3 a sectional view taken through the center of the automatically operable pneumatic pressure valve; and Figs. 4 and 5 are respectively a top plan view and a cross sectional view of the steering wheel and brake wheel.

Referring now to Fig. 1 of the drawings, there is illustrated a motor driven vehicle provided with the usual internal combustion motor 1 which is equipped with an intake manifold 2 leading from the carbureter 3 to the cylinders of the motor, all in a well known fashion. The motor 1 is adapted to propel the vehicle through means of the customary gearing and clutching mechanisms not shown. The vehicle is also equipped with the customary steering wheel 4, steering post 5, and brake pedal 6. Connected to the intake manifold 2 at a point between the carbureter 3 and the engine cylinder is a conduit 7 utilized for establishing communication between the intake manifold and the vacuum actuated cylinder or vacuum device 8, which may be mounted in various operative positions, but is preferably in this embodiment mounted upon the steering post 5 just forward of the dash board 9.

In order to control and regulate the vacuum created in the pneumatic pressure operable device 8, an automatically operated valve mechanism 11 and a manually operable valve mechanism 12 are interposed in the conduit 7 between the intake manifold and the pressure operable device 8.

The automatically operable valve mechanism 11, Fig. 3, comprises an outer casing 13 provided with an upper vacuum chamber 14 and a lower cylinder 15. Port 16 is provided in the casing 13 for inserting the conduit 7 to establish communication between the intake manifold 2 and the vacuum chamber 14. In the bottom of the vacuum chamber 14 is a port 17 controlled by a valve 18. Below the valve 18 and in the casing 13 is a port 19 in which is inserted a section 7a of the conduit 7 that leads to the manually operable valve mechanism 12. The valve 18 is provided for controlling the passage through the casing 13 and is resiliently biased towards its closed position by means of a helical spring 21, one end of which rests upon the top of the valve 18, the other end being fitted in an inverted cup member 22, carried by a threaded set screw 23 disposed in the top of the valve casing 13. The purpose of the screw is to vary the compression of the spring 21 to predetermine the effort necessary to open the valve 18, and to prevent its turning when once adjusted it is locked in place by the lock nut 10.

Slidably fitted in the cylinder 15, and connected by means of a stem 20 to the valve 18 is a piston 24. The piston 24 is provided to aid the force created by the suction in the intake manifold in the opening of valve 18. To actuate the piston 24 fluid pressure is introduced through the port 25 in the bottom of the cylinder 15.

In order to provide fluid pressure for actuating the piston 24 that will assist the force created by the vacuum in the intake manifold in holding the valve 18 open when the vehicle and motor are traveling at high speeds, and which will allow it to close gradually when the motor slows down with the stopping of the machine, the oil pressure created by the oil pump 27 (Fig. 1) of the motor is introduced into the base of the cylinder 15 by means of a conduit 26 which leads from the oil pump 27 to the cylinder 15. Accordingly when the motor is running at high speeds the oil pressure will cause the piston 24 to be forced upwardly to help open the valve 18. When the vehicle is being braked and the motor slows down, resulting in the oil pressure decreasing, the piston 24 and valve 18 are forced down by the spring 21, thereby obstructing the opening 17 in the casing 13. The spring 21 may be readily adjusted by means of the set screw 23 so that when the motor has decelerated to a predetermined speed the oil pressure will not substantially affect the valve mechanism 11, and the opening therethrough will be dependent upon the suction force of vacuum created in the intake manifold 2. To permit any oil which may get past piston 24 into the upper part of cylinder 15 to return to the engine so it will not interfere with the operation of the piston, a return line pipe 15a is connected between a port 15b located adjacent the top of cylinder 15 and engine 1. The purpose, operation and function of this valve will be more clearly set forth hereinafter.

In order to facilitate assembly of the manually operable valve mechanism 12 the intermediate secion 31 may be cast integrally with the cylinder 28 which incases the bellows 29, and the upper section 32 and the lower section 33 may be secured thereto by means of the bolts as illustrated in Fig. 2. The upper section 32 comprises a vacuum chamber 34 provided with port 35 for receiving the conduit section 7a of the vacuum line, an opening in the top for receiving a valve stem 37, and a tapered port 38 in the bottom adapted to seat a valve 39. The valve 39 is loosely mounted on the valve stem 37 and is shaped to close the port 38 when the valve is forced upwardly. Directly beneath the chamber 34 and in the middle section 31 is a chamber 41, provided with a duct 42 leading to and establishing communication with the pressure device 8. The port 38 and the valve 39 are positioned at the top of the chamber 41 and a similar port 44 and a cooperating valve 45 loosely mounted on the valve stem 37, are positioned at the bottom of the chamber.

A coil spring 46 is positioned between and constantly bears on valves 39 and 45, urging them toward their respective seats 38 and 44.

The port 44 establishes communication with a chamber 47 located just below the port, and to maintain atmospheric pressure within this chamber a port 48 is provided which is open to the surrounding atmosphere.

In the bottom of the chamber 47 is a central opening through which the valve stem 37 projects. Below the chamber 47 is another chamber 52, which is divided into two compartments 53 and 54 by means of a flexible diaphragm 55, disposed between section 31 and the section 33 of the valve casing. The upper compartment 53 is placed in communication with the vacuum device 8 by means of a duct 56 which connects it to the duct 42. The screw 49 is provided for regulating the opening between the ducts 56 and 42.

The diaphragm 55 has a bearing disc 57 provided in the center for receiving the end of the valve stem 37, and in order to counterbalance the weight of the valve stem and maintain the diaphragm 55 and valve stem 37 in normal position, a coil spring 58 is inserted below the disc 57, a depression 59 being formed in the lower section 33 of the casing for its reception.

In order that the diaphragm 55 may be actuated in response to the vacuum created in the compartment 53, atmospheric pressure is maintained in the lower compartment 54 by a small port 61 provided in the casing 33 directly below the spring 58. For opening the valve 39 a shoulder 62 is provided on the valve stem 37 just above the valve 39. This shoulder is adapted to impinge upon the valve 39 when the valve stem 37 is actuated in a downward direction. Similarly, for opening the valve 45 a shoulder 63 is provided on the valve stem 37 just below the valve 45 and is adapted to impinge upon the valve 45 when the stem moves upwardly.

In this valve mechanism 12 it will be seen that the suction created in the chamber 34 by the vacuum in the intake manifold will tend to close the valve 39, and in order to open the valve 39 to create a vacuum in the pneumatic pressure device 8, the valve must be forced downwardly, by applying a force at the top of the valve stem 37. In order to open the valve 39 the stem 37 must be pressed downward with a force sufficient to overcome the resistance of the spring 46, the spring 58, the diaphragm 55 and the suction on the valve 39. In order to maintain the valve 39 open after a vacuum has been created in the vacuum device, the downward force applied to the stem 37 must be sufficient to overcome the tendency of the diaphragm 55 to press the valve stem 37 upwardly. The duct 56 establishes communication regulated by the screw 49 between the vacuum device 8 and the vacuum compartment 53, and the port 61 establishes atmospheric pressure in the lower compartment 54; consequently as pressure in the compartment 53 is reduced, atmospheric pressure in the lower compartment exerts a force in the upward direction upon the diaphragm 55 and the valve stem 37. Hence, a definite pressure may be maintained in the pressure device 8 if a constant force is applied to the valve stem 37 which will overcome a predetermined amount of back pressure on the diaphragm 55.

Various means may be provided for actuating the valve mechanism 12. A preferred means is illustrated here which comprises a helical spring 64 that is secured to the disc 65 threaded on the valve stem 37, and to a similar disc 66 that forms the lower end of a connecting rod 67. The connecting rod 67 in turn is attached to a projection 68 (Figs. 1 and 5) that forms a part of a sleeve 69, which is loosely mounted upon the steering post 5, and prevented from turning thereabout by a trunnion 70. The upper end of the sleeve member 69 terminates in a shoulder portion 71 that functions as a support for a brake actuating wheel 72, loosely mounted on the steering post 5. The sleeve 69 is so disposed on the post 5 that its shoulder 71 normally holds the hub 73 of the brake-actuating wheel 72 in engagement with a shoulder or disc 74 affixed to the steering wheel 4. The brake-actuating wheel 72 is thus maintained adjacent to and immediately below the steering wheel 4, and the distance between the two wheels is made such that the operator of the vehicle can either push down on one side of the rim of the brake-actuating wheel with his thumb or pull up on it on the other side with his fingers to force the sleeve 69 downwardly as illustrated in Fig. 5, without removing his hands from the steering wheel. The pin 20 is employed to insure movement of the brake wheel 74 with the steering wheel 4. A downward force exerted on the sleeve 69 is transmitted to the spring 64 by means of the connecting rod 67, which in turn biases the valve stem 37 to open the valve 39. By displacing the sleeve 69 far enough sufficient pressure may be impressed upon the spring 64 to force the valve stem 37 to unseat the valve 39. When it is desired to create an operative amount of vacuum in the vacuum device 8, the brake-actuating wheel 72 must be displaced sufficiently to apply a force that will overcome the resistance of the spring 46, the spring 58, the diaphragm 55, and the back pressure on the diaphragm 55 hereinbefore described.

When the air in the pneumatic device 8 and the vacuum compartment 53 has been exhausted sufficiently, the diaphragm 55 will be forced upward by atmospheric pressure, which exerts an upward force on the lower end of the valve stem 37, overcoming the downward pressure in the spring 64, and allowing the valve 39 to seat. As air leaks into the bellows 83 of vacuum device 8 reducing the pull on the cable 88, if the spring 64 is maintained under a constant compression, the diaphragm 55 will be forced down by the stem 37, and the valve 39 will again open to exhaust the air in the bellows 83. It will be readily understood that when once a constant pressure is applied to spring 64 the valve 39 will automatically maintain a substantially constant pressure in the pressure device 8, the amount of the air exhausted therefrom being governed by the pressure in the spring 64, which depends on the amount of depression of sleeve 69, etc. Hence, through the use of the springs 64 and 46 and the diaphragm 55 which is rendered responsive to the pressure in the pressure chamber and cylinder 8 through the agency of the Venturi connection 56, the valve 39 may be either held open by the pressure applied to the stem 67 through the spring 64 or forced closed by the pressure applied to such stem and the diaphragm 55 whereby the pressure in the cylinder 8 is maintained at a selected value within certain limits.

While the vacuum device described hereinbefore may take several different forms, a collapsible bellows type of mechanism is preferred in this application. The outer casing or housing 28 for incasing the collapsible bellows is preferably secured to the steering post 5 of the vehicle just forward of the dash board 9, by removable clamps 81 and 82 or the like. The bellows itself comprises a flexible rubber casing 83 or material of that character. The upper end of the bellows 83 is fixedly secured to the head of the casing 28 as shown and the free end is attached to a movable piston-like head member 84 which is disposed to move back and forth in the cylindrical housing 28.

In order to normally bias the bellows 83 to its extended or open position, a helical spring 85 is inserted inside of the bellows 83 biasing the head member 84 toward its outer position and preventing the flexible bellows 83 from folding inwardly when it collapses. When the air in the bellows is exhausted by the vacuum created in the intake manifold 2 as regulated by the valve mechanism referred to hereinbefore, the piston head 84 of the bellows 83 is actuated inwardly by atmospheric pressure, and the force exerted on the head is equal to the difference in pressure on the inside of the bellows 83 and the atmospheric pressure outside of it, and in order that the vacuum inside the bellows 83 will always be comparable with the vacuum in the intake manifold and making it possible to obtain automatic brake regulation by means of the automatically operable valve 11, an opening 80 is provided in the head 84 which allows a small amount of air to leak into the bellows 83 so that there will always be a slightly less suction on the valves on the bellows side.

In order to utilize the bellows 83 for actuating the brakes of the vehicle, means are provided for connecting the piston head 84 to the brake operating mechanism. The connecting means may take different forms and shapes but in order to simplify the installation, a pulley 86 is mounted by means of a clamp 87 to the steering post 5 as illustrated in Fig. 1, and a cord 88 is connected to a projection 89 on the piston head 84, passed around the pulley 86, and connected by means of a clevis 90 to the foot-brake lever 91, which is operatively coupled in the usual manner to operate the brakes of an automobile.

The actual brakes are not shown in this application inasmuch as they may be of any standard and well-known construction, and in themselves they constitute no part of the invention. The operating mechanism for the brakes is shown in Fig. 1, and comprises the rear brake rod 92 which is connected to the foot brake lever 91 in the usual way, and a front brake rod 93 which is connected to one end of a crank 95 mounted upon a rocker shaft 96. The other end of the crank 95 in turn is connected by means of a rod 97 to a lever 99 to which a front brake actuating rod 94 is also attached.

In braking a motor-driven vehicle by means of four-wheel brakes, it has been found that it is desirable to apply a smaller braking effort to the front wheels than is applied to the backwheels and in order to obtain efficient braking on the front wheels when a machine is traveling at high speeds and to insure safe control of the machine it is desirable to provide for reducing the braking effort as the machine decelerates. For automatically reducing the braking effect of the front wheel brakes as the vehicle is slowing down or is being retarded, a compensating device is provided in this system and comprises the lever 99 which is pivotally supported in a slotted opening 101 disposed in a frame 102 which may be secured to the vehicle chassis or body in any desired manner. The connecting rod 97 is connected to the free end of the lever 99 and the front wheel brake rod 94 is connected to it at a point spaced downward therefrom (the distance between the two being predetermined by the braking effort desired in the front brakes as compared to that of the rear brakes).

In order that the tension in the brake rod 94 may be changed to increase or reduce the applied braking effect on the front wheels without changing the pressure applied to the foot brake lever 91, a sliding or movable fulcrum 103 is provided. This comprises a pair of rollers 104 and 105 mounted in a bifurcated structure 106, the roller 105 being disposed to engage the compensating lever 99 and the roller 104 being adapted to move along a projection 107 forming a part of the base member 102.

In order that this fulcrum may be actuated upwardly to secure the greatest amount of braking tension in the rod 94 when the vehicle is traveling at its highest speed, a cylinder 108 is provided in the bottom of the base member 102 and within which a piston 109 is disposed and connected by a piston rod 111 to the fulcrum member 103. Pressure from the oil pump 27 is introduced in the cylinder through a port 112 disposed at the base of the cylinder. The means for connecting the oil pump 27 to the cylinder is not shown and it is not deemed necessary. Consequently when the motor is running at high speed and the greatest braking effort is required the piston 109 will be forced upwardly by the oil pressure, positioning the fulcrum 103 at its highest position.

In order that the fulcrum may be moved downwardly as the motor decreases in speed and the oil pressure falls, a spring 113 is provided inside of the cylinder 108 and adapted to oppose the oil pressure and drive the piston and fulcrum downward in accordance with the decreasing pressure of the oil.

The operation of the system may be briefly described as follows, assuming that the automobile with which the system is employed is moving and that its motor is running.

When it is desired to apply the brakes, brake wheel 72 is tilted by the operator, in the manner shown in Fig. 5, sufficiently to move sleeve 69 and rod 67 down far enough to open valve member 39 of valve 12 a distance corresponding to that necessary to apply the desired braking effort. With the opening of valve member 39 a difference in pressure is established on the two sides of valve member 18 of valve 11 by the suction in the intake manifold, which assisted by the upward force on the valve, of the oil pressure in chamber 15 bearing against piston 24, causes the valve to open. The opening of this valve permits the air in the collapsible cylinder or bellows 83 to be drawn out by the suction created in the intake, and a vacuum to be established therein. As the air is thus withdrawn from cylinder 83 the atmospheric pressure acting on it in opposition to the force of spring 85 causes the cylinder to collapse upwardly whereby cable 88 which is connected to plate 29 and the braking apparatus is placed under tension and the brakes applied. When the air is exhausted from cylinder 83 sufficiently to apply the desired pressure to the brakes as determined by the amount of depression of the brake wheel 72, the diaphragm 55 which forms the lower wall of chamber 52 connected by passages 42 and 56 to cylinder 83 is forced upwardly by the atmospheric pressure and overcomes the downward pressure of spring 64 causing valve member 39 to seat and stop the further withdrawal of air from the cylinder.

Due to the presence, however, of vent 80 in the lower wall 29 of cylinder 83 air continuously leaks into the cylinder and reduces the vacuum therein as well as in chamber 52. This results in the pressure on diaphragm 55 being reduced sufficiently to permit spring 64 to reopen valve 39. Consequently valve 39 opens and closes automatically as the pressure in cylinder 83 and chamber 52 changes. With the slowing down of the machine due to the action of the brakes the motor decelerates, and the oil pressure in cylinder 15 of valve 11 falls which allows spring 21 to gradually close valve 18. Thus the suction from the intake manifold is gradually shut off in accordance with the deceleration of the machine. This has the effect of automatically reducing the suction on cylinder 83 and permits the leakage of air through vent 80 to gradually reduce the pressure on the brakes in proportion to deceleration of the car and as has been described hereinbefore controls the braking of the car in such a way as to obtain maximum braking at all times.

When it is desired to release the brakes the operator lets go of brake wheel 72 allowing it to assume its normal inoperative position. With the removal of this downward pressure on valve 39, spring 46 forces it closed and at the same time permits valve 45 to open due to the difference in pressures in chambers 41 and 47, respectively. When valve 45 opens air is permitted to pass into cylinder 83 destroying the vacuum therein and permitting spring 85 to extend the cylinder to its normal expanded position whereby the tension in cable 88 is relieved and the brakes released.

In order for the system to operate in the manner described, cylinder 83 is constructed in such proportions that the suction obtainable in the motor intake manifold at all times when the vehicle is being operated by the motor will be sufficient to produce the amount of pull necessary on the cable 88 to apply the brakes for maximum braking independently of the speed at which the vehicle is running, and also valve 11 is so constructed that the oil pressure produced in chamber 15 and the suction in chamber 2 will be sufficient at all times and under all conditions to properly operate valve member 18 in the manner described.

It will be understood by those skilled in the art that I have provided a braking system for automobiles or motor driven vehicles by means of which the brakes may be applied with comparative ease, and by means of which the maximum braking effort can be exerted upon the machine when it is traveling at high speed, and which will automatically reduce the braking effect as the machine decelerates.

Special emphasis is placed upon the automatic valve mechanism 11 which is disposed in the communicating conduit 7 for positively accomplishing the automatic reduction of vacuum pressure, and also upon the compensating device utilized in connection with the front wheel brake mechanism for automatically varying the braking effect on the front wheels.

This latter feature of the invention is made the subject matter of another application, Serial No. 71,555, filed March 30, 1936, which is in part a continuation of the present application.

By the term vacuum as used herein is not meant a complete absence of air, or of atmospheric pressure, but rather a condition of reduced atmospheric pressure, caused by partial exhausting of the air from the chambers and passages referred to.

Although a preferred embodiment has been illustrated and described in detail as required by the patent statutes, it is believed that many changes in construction and association of parts may be made without departing from the spirit of the invention. It is therefore not intended to limit the invention beyond that particular point defined by the appended claims.

I claim:

1. In combination with a motor driven vehicle, a brake applying mechanism, fluid pressure operable means for actuating said brake applying mechanism, manually operable means for applying pressure to said brake applying mechanism and including means for regulating the pressure exerted on the brake applying mechanism, and means responsive to the speed of the motor for automatically regulating the pressure supplied to the pressure operable means.

2. In combination with a motor driven vehicle, means for creating a suction, a brake applying mechanism, suction operable means for actuating said brake applying mechanism, manually operable means for applying suction to said brake applying mechanism and including means for regulating the force exerted on the brake applying mechanism, and means responsive to the speed of the motor for automatically regulating the suction applied to the vacuum operable means.

3. In combination with a motor driven vehicle having an internal combustion motor provided with an intake manifold, a brake applying mechanism, pneumatic pressure operable means for actuating said brake applying mechanism, a conduit for establishing communication between said intake manifold and said pressure operable means, a manually operable valve disposed in said conduit for applying pressure to said brake applying mechanism and including means for adjustably selecting the pressure exerted on the brake applying mechanism, and a speed responsive valve also disposed in the conduit for automatically regulating the pressure applied to the pressure operable means in accordance with the speed of the motor.

4. In combination with a motor driven vehicle comprising means for creating a pneumatic pressure, a brake applying mechanism, pressure-operable means for actuating said brake applying mechanism, a conduit for establishing communication between said pneumatic pressure creating means and said pressure-operable means, a fluid pump driven by the motor and adapted to provide a fluid pressure proportional to the speed of the motor, a pressure regulating valve disposed in the communicating conduit and adapted to be activated by fluid pressure, whereby to vary the force exerted on the brake applying mechanism in accordance with the speed of the motor, and a manually operable valve disposed in said conduit between said pressure regulating valve and said brake applying mechanism for applying the pressure to the latter mechanism and including means for varying the pressure applied to the braking mechanism at the will of the operator.

5. In combination with a motor driven vehicle, of means for creating a pneumatic pressure, a brake applying mechanism, pressure-operable means for actuating said brake applying mechanism, a manually-operable valve for applying said pressure to said brake applying mechanism, said manually operable valve including means for selecting at the will of the operator the amount of pressure supplied to the brake applying mechanism, a fluid pump driven by the motor and providing a fluid pressure varying with the speed of the motor, and a second valve adapted to be actuated by said fluid pressure to automatically vary the pneumatic pressure exerted on the brake applying mechanism in accordance with the speed of the motor.

6. In combination with a motor driven vehicle having an internal combustion motor provided with an intake manifold, a brake applying mechanism, vacuum-operable means for actuating said brake applying mechanism, a conduit for establishing communication between the intake manifold and the vacuum-operable means, a manually-operable valve disposed in said conduit for admitting at will vacuum of varying values determined by its operation to the vacuum-operable means, a fluid pump driven by the motor, and a second valve disposed in the communicating conduit and adapted for actuation by the fluid pressure provided by said pump, whereby to automatically vary the vacuum applied to the vacuum-operable means in proportion to the speed of the motor.

7. In combination with a source of fluid pressure, a conduit through which varying degrees of pressure are to be established in a brake-actuating device connected to said source, a control valve casing having an upper chamber and a lower cylinder, said upper chamber being provided with ports communicating with the said conduit, a pressure-controlling valve movable in said upper chamber, a piston disposed in said cylinder and connected to said valve, a source of fluid pressure connected to said cylinder below said piston, a leakage conduit leading from said cylinder above said piston, and a resilient member adapted to bias said valve to its seated position, and adjustable means for regulating the pressure exerted by said resilient member on the valve.

8. The combination with an automobile having a brake applying mechanism, a steering wheel and steering post, of a pressure operated device for actuating the brake applying mechanism comprising a pressure operable cylinder adapted to be detachably mounted on the steering post, a control valve for said cylinder mounted integrally therewith, and manual means for operating said valve mounted on the steering post adjacent the steering wheel.

9. In combination with a motor driven vehicle having an internal combustion motor provided with an intake manifold, a vacuum brake-actuating device, a conduit for establishing communication between said intake manifold and said brake actuating device, a manually operable valve for controlling the vacuum established in the brake-actuating device by the vacuum created in the intake manifold, a steering wheel and post, means for detachably mounting the brake-actuating device on the steering post, and means associated with the steering wheel and operable therefrom for actuating the control valve at will.

10. In combination with a motor-driven vehicle equipped with a steering post, a pneumatic pressure actuated brake-operating device mounted upon said steering post, a manually-operable valve for controlling the pressure in said device, a steering wheel, a brake wheel loosely and rotatably mounted upon said steering post adjacent to said steering wheel, means engaging said brake wheel loosely mounted on said steering post, and operatively connected to said valve and adapted to be actuated by said brake wheel when a force is applied to the rim of the brake wheel in either an upward or downward direction.

11. In combination with a motor-driven vehicle provided with an internal combustion motor having an intake manifold, a brake-applying mechanism, a control valve casing having communication with the manifold, the brake-applying mechanism, and the atmosphere, a pair of valves for selectively establishing communication between the brake-applying mechanism and either the manifold or the atmosphere slidably mounted on a common valve stem to seat on rigid seats formed in said casing, resilient means disposed between said valves for normally holding said valves in seated positions, manually operable means for actuating said valves, and means in said casing operable independently of said valves arranged to respond to the degree of actuation of the brake-applying mechanism for opposing the establishment of communication between the brake-applying mechanism and the manifold to obtain a constant braking effect upon the brake-applying mechanism.

12. In combination with a motor driven vehicle provided with an internal combustion engine having an intake manifold, a brake applying mechanism, a control valve casing connected to said intake manifold, said brake applying mechanism and communicating with the atmosphere, a pair of relatively movable valves mounted in spaced concentric alignment in said casing and disposed to control the connection of said brake applying mechanism with the intake manifold and atmosphere, a common valve stem on which said valves are both slidably mounted, means normal-up urging said valves to their seated positions, and means responsive to the pressure conditions maintaining in said brake applying mechanism also located in said casing for modifying the operation of said valves.

13. The combination with a motor driven vehicle provided with a steering post and brake applying means, of a pressure operable cylinder and piston for operating said brake applying means, a valve casing mounted on said post and connected to said cylinder, a source of fluid power and communicating with the atmosphere, a pair of valves mounted in spaced concentric alignment with their axes parallel to the steering post in said casing and disposed to control the connection of said cylinder to said power connection and the atmosphere, a common valve stem on which said valves are loosely mounted, a spring urging said valves to their seated positions, adjustable means for actuating said valves mounted on said post above said valve casing and yieldably connected to said valve stem, means responsive to the pressure conditions in said cylinder engaging the lower end of said valve stem for modifying the operation of said valves, and spring means for overcoming the action of gravity on said valve stem assembly.

NATHAN M. LOWER.